Nov. 10, 1936.    A. C. VELO    2,060,705
FUEL FEED CONTROLLER AND GEAR SHIFT POSITION INDICATOR FOR AUTOMOBILES
Filed Sept. 29, 1934    2 Sheets-Sheet 1
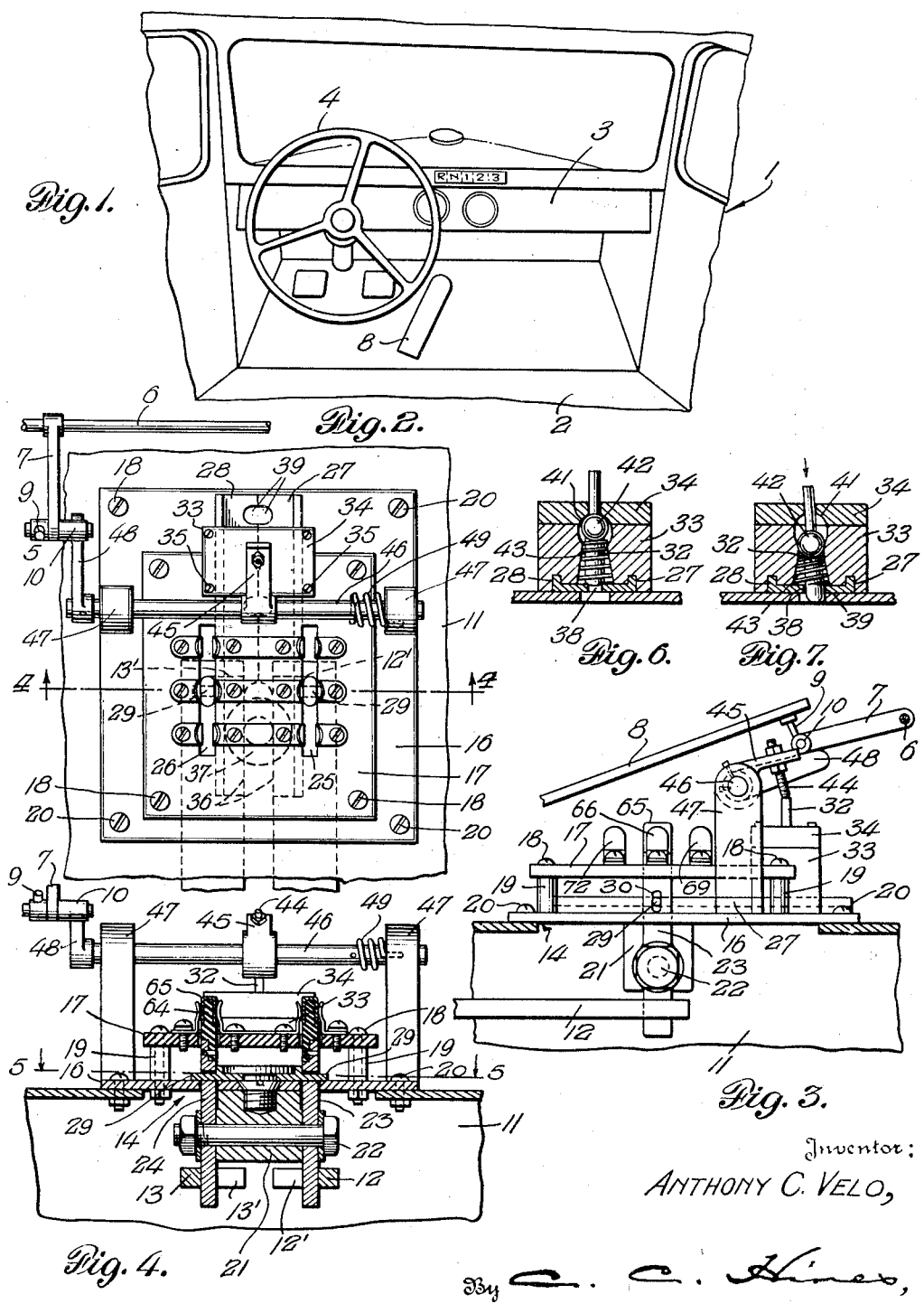
Inventor:
ANTHONY C. VELO,
By C. C. Hines,
Attorney Nov. 10, 1936.  A. C. VELO  2,060,705
FUEL FEED CONTROLLER AND GEAR SHIFT POSITION INDICATOR FOR AUTOMOBILES
Filed Sept. 29, 1934  2 Sheets-Sheet 2

Inventor:
ANTHONY C. VELO,
By
Attorney.

Patented Nov. 10, 1936

2,060,705

UNITED STATES PATENT OFFICE 2,060,705

FUEL FEED CONTROLLER AND GEAR SHIFT POSITION INDICATOR FOR AUTOMOBILES

Anthony C. Velo, Lancaster, Pa., assignor, by direct and mesne assignments, to Vaco Products, Inc., a corporation of Delaware Application September 29, 1934, Serial No. 746,242

8 Claims. (Cl. 74—472)

This invention relates to a combination accelerator control device or lock and gear shift position indicator for use in conjunction with the accelerator and gear shift operating means of automobiles employing an automatic or semi-automatic gear shift mechanism.

In the use, on automobiles, of an automatic or semi-automatic gear shift mechanism, operated by pneumatic or other power means, it is desirable to prevent the supply of an excess amount of fuel to and consequent racing of the automobile engine at times when the gear shift mechanism is in neutral or is in process of making a direction or speed change. In the use of such a gear shift mechanism it is also desirable that the driver may know at any and all times with certainty what gear the speed change mechanism of the vehicle is in, and whether or not the required speed changes are being made by the speed change mechanism in the operation of the vehicle.

One object of my present invention is to provide a means for locking or otherwise preventing movement of the accelerator pedal or other control part of the fuel feeding means of the vehicle when the transmission is in neutral or in process of making a direction or speed change in order to properly control the feed of fuel to the motor at such times so as to prevent overspeeding or racing of the engine, clashing of gears and other resulting irregular actions of the gear shift mechanism.

Another object of my present invention is to provide a signal means or indicator, preferably of electrical type, for visually indicating to the driver the speed changes in the speed change gearing as they are made and the setting of the gearing, so that the driver may be correctly advised as to whether or not the gearing is operating correctly and also advised as to the position of the parts of the speed change gearing, whether in reverse, first, second or high speed, at any time.

Still another object of the invention is to provide a combination accelerator control device and indicator embodying locking and indicator controlling means acting cooperatively to prevent faulty action of the engine during certain positions of the change speed mechanism and to indicate the gear shift actions of the change speed mechanism as they occur.

Still another object of my present invention is to provide an indicating means of the character described which is positively governed and controlled by moving parts of the gear shift mechanism so that accurate signal indications will be given.

Still another object of my invention is to provide a device of the character described which may be removably mounted at the point where the gear shift lever mounting is commonly placed, when the use of a permanently mounted gear shift lever is dispensed with, whereby a simple and convenient working arrangement of parts is obtained and one permitting of the use of such a lever in the event of derangement of the automatic power means.

With these and other objects in view, which will appear in the course of the subjoined description, the invention consists of the features of construction, combination and arrangement of parts, hereinafter fully described and claimed, reference being had to the accompanying drawings, in which:—

Fig. 1 is a view of a portion of an automobile, looking toward the footboard and instrument board, and showing the application of the invention.

Fig. 2 is a plan view, on an enlarged scale, of parts shown in Fig. 1.

Fig. 3 is a side elevation, partly in section, of the transmission housing and the switch device and associated parts of the accelerator.

Fig. 4 is a vertical transverse section through the gear shift housing and the switch device.

Figs. 6 and 7 are vertical transverse sections through the switch device showing the locking plunger in its accelerator locking position and one of its accelerator releasing positions.

Figure 5:
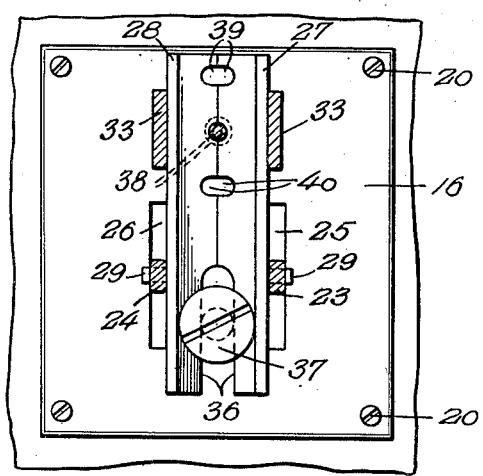
Fig. 5 is a horizontal section on line 5—5 of Fig. 4.
Figure 8:
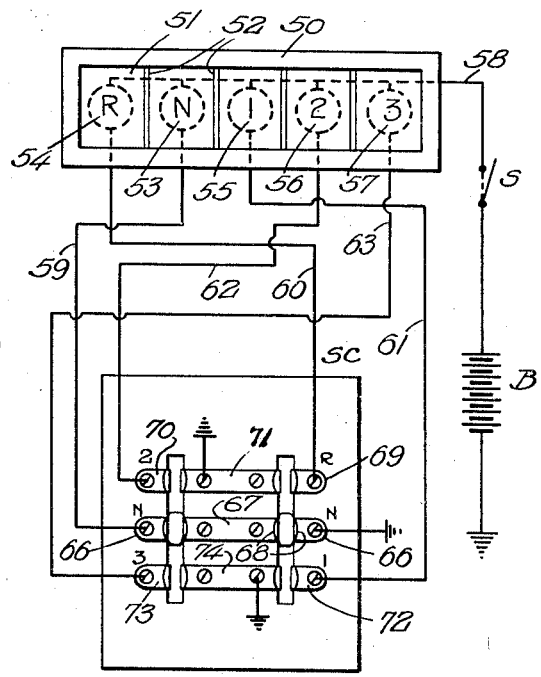
Fig. 8 is a diagram of the indicator circuit.
Figure 9:
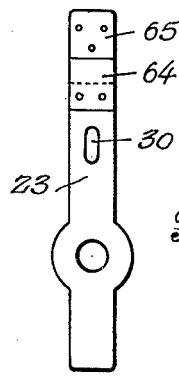
Fig. 9 is a detail view of one of the switch levers.

Figs. 10 to 14, inclusive, are views showing companion neutral and shifted positions of the shifter bars and locking slides.

It is to be understood that the accelerator or throttle lock and gear shift position indicator shown herein and constituting the present invention may be used in conjunction with a gear shift mechanism of automatic or semi-automatic type, such as disclosed in my copending applications, Serial Nos. 614,573 and 721,777, employing either an automatic or a manually operable clutch or a combination automatic and manually operable clutch, and actuated by pneumatic or other suitable power, or in conjunction with any other type or make of automatic or semi-automatic gear shift mechanism. It is also to be understood that the accelerator lock and switch device of the indicator constituting the present invention may be adapted to be placed upon the transmission housing at the point where the usual gear shift lever is ordinarily mounted, when the use of a permanently mounted gear shift lever is dispensed with, or disposed in another suitable working position when a permanently mounted gear shift lever is used. It is further to be understood that the accelerator lock and switch device, when disposed at the point where a gear shift lever is commonly mounted, may be detachably secured in place to permit of its removal and the mounting of a removable gear shift lever in place for use to allow manual shifting of the gears in the event that the automatic power means for shifting the gears should become inoperative from any cause, as contemplated in the structures disclosed in my aforesaid applications. In the present instance I have, for purpose of exemplification, shown the accelerator lock and switch device removably mounted in place of a gear shift lever and for coaction with and control by the notched ends of the shifter rods usually engaged by the lever for manual shift actions, so that said device may be detached when it is desired or required for manual gear shifting, but I do not limit the invention in these respects, as the accelerator lock and switch device may be otherwise mounted and arranged to coact with and be controlled by other parts of the gearing, as, for example, the gear actuating pistons or other working parts of the power mechanism or the movable elements of the gearing itself.

Referring now more particularly to the drawings, 1 designates the forward portion of the body of an automobile of any type, 2 the usual floorboard and 3 the instrument board arranged in advance of the driver's seat, 4 the steering wheel and column, and 5 generally the usual foot operated throttle valve control device or accelerator comprising the throttle valve actuating rock shaft 6, a lever arm 7 carried thereby and the pivotally mounted accelerator foot pedal 8 operatively engaging said arm so as to communicate motion thereto in the usual manner to control the throttle valve and thereby the feed of fuel to the motor. The arm 7 is provided with a contact member 9 engaged by the pedal and carries a contact roller 10. 11 designates the transmission gear housing or casing, 12 and 13 the sliding shifter bars or rods therein which may be provided with the usual notches 12' and 13' therein for engagement by a gear shift lever in the usual manner, and 14 indicates the opening in the housing which exposes the notched ends of the shifter bars and in registry with which in practice the ball and socket casing of the gear shift lever is ordinarily mounted.

The combined throttle or accelerator control device or lock and gear shift position indicator embodying my invention comprises a support 15 embodying a metal bracket or attaching plate 16 and a superposed switch plate 17 of fibre or other suitable insulating material, said plates being connected and held in spaced relation by bolts 18 and spacing thimbles 19. This support is disposed above the opening 14 and detachably secured to the housing 11 by machine screws or other suitable fastenings 20. The plate 16 has attached thereto and depending therefrom a metal block 21 through which passes a transverse bolt 22 on which are pivotally mounted two levers 23 and 24. The lower ends of the respective levers 23 and 24 engage the notches 12' and 13' in the respective shifter bars 12 and 13 and the upper ends of the levers extend upward through and are movable in slots 25 and 26 in the plates 16 and 17, whereby in the shifting of the bars 12 and 13 the levers are moved forward and backward from a neutral position within said bars. Mounted on the plate 16 are parallel sliding lock plates 27 and 28 having projections 29 at their outer edges which engage openings 30 in the upper arms of the levers 23 and 24, by which, in the backward and forward movements of the respective levers 23 and 24, the respective lock plates will be moved with the shifter bars forward and backward from a neutral position to control the action of a locking and releasing plunger 32.

The lock plates 27 and 28 are guidedly fitted at their forward ends in a bearing block 33 of insulating material, which block is provided with a cap piece 34, said block and cap piece being fastened to the plate 17 by bolts 35, and the rear portions of the inner edges of the plates are cut away or recessed to jointly form a guide slot 36 receiving a fastening and guide screw or bolt 37 engaging the plate 16, the head of which bolt bridges across the rear ends of the lock plates and forms a fastening and guiding means for said ends of the lock plates. In advance of these cut away portions, and between the same and their forward ends, the inner edges of the lock plates are formed with coacting sets of notches or recesses 38, 39 and 40, the central notch 38 coacting, when the lock plates are in neutral position, to form an opening of small diameter and the pairs of front and rear notches coacting, when the lock plates are in neutral position, to form openings of larger diameter than said central opening. The small-sized notch 38 in each lock plate is also adapted for coaction with the larger notches in the lock plate to form openings of an intermediate size for coaction with the locking and releasing plunger 32 to control the action of the accelerator.

The plunger 32 is mounted for vertical reciprocation and oscillating movements in a plunger guide opening formed in the block 33 and its cap piece 34. The portion of the opening in the block is of larger diameter than the portion of the opening in the cap piece and at the intersection of the said portions of the opening the cap piece is formed with a partially spherical seat 41 against which a spherical head 42 on the plunger is adapted to bear to limit the upward movement of the plunger and adapt it to have universal pivotal movement at right angles to its vertical plane of locking and releasing movements. A spring 43 disposed in the plunger guide opening, about the lower end of the plunger and between the lock plates and head 42, is provided to normally hold the plunger elevated or in released position, while permitting it to have the movements above described. The upper end of the plunger is engaged by an adjustable contact screw or stud 44 carried by a rocker arm 45 on a motion transmission shaft 46 journaled in bearings 47 on the plate 16, which shaft carries a locking arm 48 engaged by the contact roller 10 on the arm 7 of the shaft 6, a spring 49 acting on the shaft 46 to hold the arm 47 and plunger normally elevated and in released position in the normal or retracted position of the accelerator pedal, i. e., the position the pedal occupies when the engine is not running or while running is idling.

The operation of the parts thus far described is as follows, reference being had to Figs. 10 to 14, inclusive, showing the positions of the shifter bars and lock plates in the working actions, said figures respectively illustrating the positions of said parts in the neutral, reverse and first, second and third speeds of the transmission gearing, in which said parts assume the working positions shown with respect to the neutral line.

Figures 10, 11, 12, 13, 14:
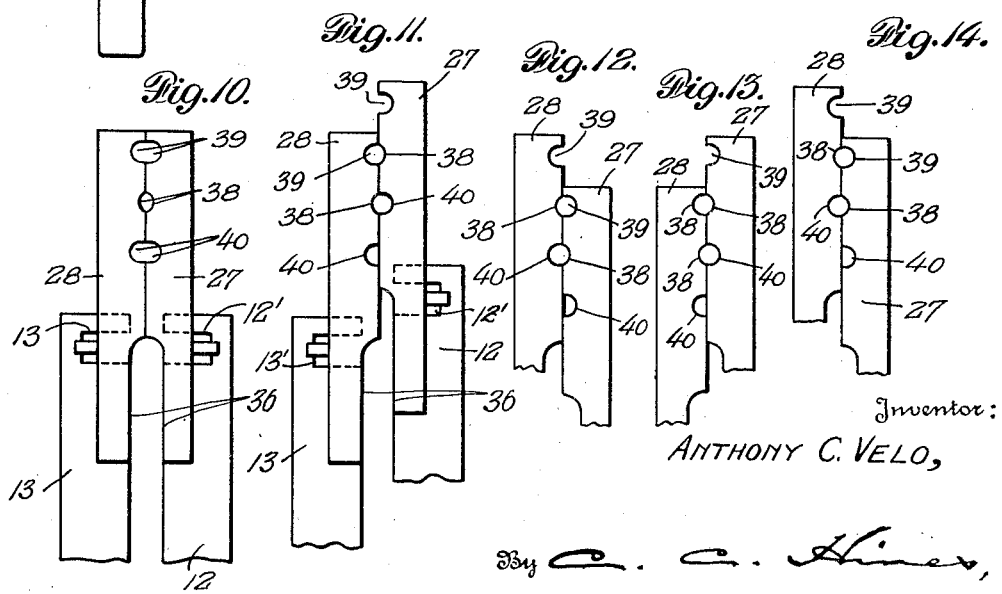

When the transmission gearing is in neutral the shifter bars 12 and 13, lock slides 28 and 29 and plunger 32 occupy the respective positions shown in Figs. 6 and 10, in which the notches 12', 13' of the shifter bars and the notches 38 if the lock slides register and the lower end of the plunger 32 rests on the lock slides. It will be observed that the opening formed by the notches 38 is of less diameter than the lower end of the plunger and hence the plunger is held from downward movement. The locking arm 48 of the shaft 46 will thus be held in raised position by the plunger, so that the accelerator pedal cannot be depressed to augment the supply of fuel to the motor beyond that allowed while the motor is idling. Hence as long as the gear shift mechanism is in neutral the driver cannot by depressing the accelerator pedal cause an additional amount of fuel to be supplied to the motor beyond that required to keep the motor running at idle speed. When, however, the shifter bar 12 is moved forward to reverse shift position the lock slide 28 will be moved by lever 23 forward to bring the notch 40 in said slide into registry with notch 38 in slide 29, as shown in Fig. 11 thus forming an opening of sufficient size through which the lower end of the plunger 32 may move, thus unlocking the accelerator and permitting it to be depressed so that the supply of fuel to the motor may be augmented as desired by the driver. It will be noted that the opening thus formed by the registering notches will be of slightly elliptical form or off center axially with relation to the plunger. As, however, the plunger is pivotally mounted it is adapted when depressed to tilt or cant laterally to accommodate itself to the eccentricity of the opening so that it may be depressed without interference from the slides. The pivotal mounting of the plunger also adapts it to tilt or cant in the direction of sliding movements of the slides so that when another change of shift occurs while the plunger is in engagement with an opening properly formed by notches in the slides it can tilt in the direction of slide movement, whereby it will be automatically retracted to locking position to hold the accelerator from depression while the shifting action is going on. When, on the other hand, the shifter bar 12 is moved rearwardly to first speed position, the slide 27 will be moved forwardly to bring its notch 38 into registry with notch 40 in slide 28, as shown in Fig. 12, to release the accelerator pedal and permit of its depression to augment the supply of fuel to the motor. Similarly movements of the shifter bar 13 to shift the gearing to second and third speed positions, will result in coacting movements of the slide 28, as shown in Figs. 13 and 14, registration of notch 38 of said slide 28 with either the notch 39 or the notch 40 of slide 27 to effect a release of the accelerator pedal for fuel feed movement by the driver as long as the gearing is in reverse, first, high or intermediate speed position, while locking the pedal from movement when the gearing is in neutral or in process of being shifted from one gear change to another. By this means racing of the motor when the speed change gears are in neutral or a shift is occurring for a change speed action will be prevented to avoid waste of fuel, undue wear and tear on the engine, faulty or too violent action of the power mechanism, and clashing of gears.

The signal mechanism employed in conjunction with the throttle control or locking mechanism comprises an indicator casing 50 disposed upon the instrument board or at some other point on the vehicle in clear view of the driver. This casing is provided with a front transparent panel 51 and is divided by partitions 52 into compartments in which are arranged incandescent electric lamps 53, 54, 55, 56 and 57 or other suitable means for respectively indicating neutral, reverse and first, second and third speed positions of the transmission gearing. These lamps, or the portions of the panel in front of the lamps, bear the appropriate designating characters "N" for neutral, "R" for reverse, and "1", "2", "3", respectively, for first, second and third speeds. The lamps, which may be of two contact type, are arranged in a signal circuit SC including a battery B, which may be the storage battery of the car. All the lamps are connected in series by a conductor 58 with one pole of the battery, the other pole of which may be grounded on the machine in the usual way. The lamps are also connected by individual conductors 59, 60, 61, 62 and 63 to contacts on the switch board or plate 17 for coaction with the lock plate actuating levers 23 and 24 which also serve as switch levers, for which purpose each lever 23 and 24 is provided at its upper end with a non-conducting portion 64 carrying a metal contact or wiper strip 65, which is thus insulated from the body of the lever. As shown, the conductor 59 is connected to one of a pair of transversely alined "neutral" contact members 66, the other of which is grounded, between which contact members 66 is disposed a bridging contact member 67. The adjacent ends of these contact members 66, 67 are bent up to form spaced contact terminals 68 for coaction with the contact strips 65 of the levers 23 and 24 when both of said levers are in neutral position, whereby the circuit will be closed through said contacts to light the lamp 53 to indicate that the transmission is in neutral. When either lever is moved from this position the connection will be broken in an obvious manner. Conductors 60 and 62 are connected respectively to two transversely alined contact members 69 and 70 between which is disposed a common grounded contact member 71, the adjacent ends of which contact members 69, 70, 71 are provided with bent up contacts 68 for coaction with the contact strips of the levers 23 and 24. Thus when lever 23 lies between contact members 69, 71, or in "reverse" position, the circuit will be closed through said contact members to illuminate the lamp 54, while when lever 24 lies between contact members 70, 71 the circuit will be closed therethrough to illuminate the second speed indicating lamp 56. Conductors 61 and 63 are connected respectively to transversely alined contact members 72, 73, between which is disposed a common grounded contact member 74, said contact members also having spaced ends bent to form contact terminals 68. Thus when lever 23 lies between contact members 72, 74 the circuit will be closed therethrough to illuminate the first or low speed indicating lamp 55, while when lever 24 lies between contact members 73, 74 the circuit will be closed therethrough to illuminate the third or high speed lamp 57. By this means the movable lock controlling elements 23, 24 of the accelerator locking and releasing device are also caused to operate as switch elements controlling a signal circuit which indicates to the driver the speed changes as and when they are made and also the particular gears of the transmission which are in engagement at any time, so that the driver may not only determine whether or not the speed changing mechanism is operating properly, but also whether the proper gears are in mesh for any usual or contemplated driving action. The driver will thus be advised of any faulty shift actions, if and when occurring, and of any failure of the gear shift mechanism to operate for normal running actions, so that he may take measures to make proper repairs or adjustments or to otherwise suitably govern the running of the vehicle.

From the foregoing description, taken in connection with the drawings, it will be seen that my invention provides a simple, reliable and efficient means for locking and preventing actuation of the accelerator foot pedal when the transmission gearing is in neutral position or in process of making a gear shift, so as to prevent the supply at such times of an excess amount of fuel to the motor. By this means racing of the motor and clashing of gears and unduly violent action of the gear shift mechanism during gear shift changes will be avoided, as well as unnecessary wear and tear on the engine and elements of the transmission. It will also be seen that the invention provides an indicating means, positively controlled by the elements of the gear shift mechanism, whereby the driver of the vehicle is at all times kept advised of the gear shift actions as they occur and of the particular position of the gearing at any time, so that he may determine whether or not the gearing is operating properly and how the machine may be controlled to best advantage. Furthermore, it will be seen that the invention provides a combination fuel feed control and indicating means of the character set forth whereby, through the action of but a single set of working parts, the driver may be kept correctly advised as to whether or not the gearing is operating correctly and also advised as to the position of the parts of the gearing, whether in reverse, first, second or high speed, at any time. As stated, I do not limit my invention in its use and application to or in conjunction with any particular type of automatic or semi-automatic speed change or transmission mechanism, as obviously it may be used in connection with automatic and semi-automatic speed change mechanism of various types, nor do I limit the invention to the particular construction and combination of parts and their particular working actions herein disclosed, as the construction, arrangement and working action of the parts may be varied to considerable degrees within the scope of the appended claims without departing from the spirit or sacrificing any of the advantages of the invention. The desirable and important, but not essential, feature of my invention resides in the provision of a unitary accelerator lock and switch structure which may be mounted on the transmission housing in place of and at the point where a manual gear shift lever mount is ordinarily placed, in which position it is advantageously adapted for coaction with the shifter bars or other working parts of the transmission mechanism, this positioning also allowing of the removal of the lock and switch structure for application of a gear shift lever to allow a manual shifting of the transmission gearing to be performed in the event of derangement of the automatic mechanism. It is to be understood, however, that I do not limit the invention to any particular point of mounting of the combination lock and switch, as it may be mounted at other points on or within the transmission housing or other suitable portion of the vehicle.

What I claim is:—

1. In an automobile having a gear shift mechanism including gear shifter elements, and a fuel feeding means including a pivotally mounted accelerator pedal for operating a throttle valve governing the supply of fuel to the automobile motor, means controlled by the shifter elements of the gear shift mechanism for locking the accelerator in release position to limit the supply of fuel to the motor when the gear shift mechanism is in neutral or said elements are shifting to effect a gear change.

2. In an automobile having a gear shift mechanism, and a fuel feeding means governing the supply of fuel to the automobile motor, means controlled by the gear shift mechanism for governing the fuel feeding means to limit the supply of fuel to the motor when the gear shift mechanism is in neutral or in process of making a gear change.

3. In an automobile, the combination of a gear shifting mechanism, a manually operable device for controlling the supply of fuel to the motor, and means governed by the gear shift mechanism for preventing actuation of said device when the gearing is in neutral or in process of being shifted for making a gear change.

4. In an automobile, the combination of a gear shifting mechanism, an accelerator, and means controlled by the gear shift mechanism for preventing actuation of the accelerator when the gearing is in neutral or in process of being shifted for making a gear change.

5. In an automobile, a gear shift mechanism including a housing having an opening therein through which shifting elements of the gear shift mechanism are exposed, an accelerator, and a control device mounted in line with said opening and operative by said shifting elements for locking the accelerator from movement when the gearing is in neutral or in process of making a gear change.

6. In an automobile, the combination with fuel controlling means for controlling the supply of fuel to the motor, including a manually operable control device, and a gear shifting mechanism having movable shifting elements, an element movable into and out of the path of movement of said manually operable device for locking the same against and releasing it for movement, and means governed by said shifting elements for controlling said locking element to lock the manually operable device when the gear shift mechanism is in neutral position and during gear shifting movements.

7. In an automobile, an accelerator controlling the feed of fuel to the automobile engine, a speed changing mechanism including shifters for operating the same, and a locking and releasing means comprising a member arranged in the path of movement of the accelerator and members controlled in action by said shifters and coacting with the first-named member for locking the accelerator from movement when the gearing is in a neutral position or in process of making a shift and releasing the same for movement at other times.

8. In an automobile, a gear shift mechanism including low speed and reverse and intermediate and high speed shifter rods and a housing having an opening therein through which said rods are exposed, a fuel control device, and locking means disposed between the shifter rods and accelerator in line with said opening and comprising a vertically movable locking member and horizontally movable locking members respectively controlled in action by the movements of the accelerator and shifting movements of the shifter rods for preventing actuation of the fuel control device in certain positions of said gearing.

ANTHONY C. VELO.